United States Patent Office 3,373,131
Patented Mar. 12, 1968

3,373,131
EPOXY RESIN COMPOSITIONS AND NOVEL
INKS CONTAINING THE SAME
Richard Bolstad, Bronx, N.Y., and Michael J. Tinghitella, Wayne, and Rupert J. Schefbauer, Hasbrouck Heights, N.J., assignors to Interchemical Corporation, New York, N.Y., a corporation of Ohio
No Drawing. Filed Nov. 30, 1965, Ser. No. 510,691
14 Claims. (Cl. 260—31.8)

This invention relates to epoxy resin compositions, particularly to epoxy resin compositions which may be used in hot melt inks suitable for printing on glass.

In recent years, especially with the rise in use of "non-returnable" bottles for many consumer beverages, the demand for inks for printing on glass has been steadily increasing. What is needed is an inexpensive ink having good adhesion to glass. The ink must dry rapidly after application in order to facilitate handling of the glass receptacles during production of the same.

We have found that epoxy resins, particularly solid or semi-solid epoxy resins formed by the reaction of p,p'-dihydroxy diphenyl dimethyl methane and epichlorohydrin display very good adhesion to glass. However, such epoxy resins particularly the normally solid epoxy resins present problems in inks. When such resins are used in hot melt inks, they dry too rapidly. That is, they tend to dry on the equipment such as screen stencils before they can be applied.

We have now found that by blending or dissolving such epoxy resins with dialkyl terephthalates such as dimethyl, diethyl or diisopropyl terephthalates, these problems are completely eliminated and we have an ink vehicle which sets rapidly within 0.1 to 3 seconds upon being brought into contact with a surface such as glass at room temperature to provide printing having excellent adhesion to the glass surface. The terephthalate is removed from the applied printed film preferably by heating to volatilize it leaving primarily the epoxy resin and the pigment, if any is used.

For many applications, the epoxy resin in the applied composition need not be cross-linked. However, for more durable printing on the bottle, it is preferable that the composition further contain a conventional curing agent for cross-linking the epoxy resin. Among conventional curing agents are amines such as ethylenediamine, diethylenetriamine, piperidine and dimethylaminomethylphenol. Most preferably, the amine is dicyandiamide. The curing is preferably at 350° to 400° F. for about 10 to 30 minutes.

The epoxy resins or polyepoxides used in this invention are resins produced by the reaction of a polyhydric phenol, particularly p,p'-dihydroxy diphenyl dimethyl methane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of p,p'-dihydroxy diphenyl dimethyl methane, a higher weight polyepoxide resin may be produced. For hot melting applications, the epoxy resins should preferably have a molecular weight of at least 700 and most preferably from 700 to 900. The polyepoxide resins produced by the reaction of epichlorohydrin and p,p'-dihydroxy diphenyl dimethyl methane may in addition be esterified with vegetable oil fatty acids including coconut acids, cottonseed acids, dehydrated castor fatty acids, linseed oil fatty acids, oiticia fatty acids, soy acids and tung fatty acids.

Preferably from 0.05 to 0.5 part of the terephthalate are used for each part of epoxy resin.

The pigment which may be any conventional pigment may preferably constitute from 1 to 50% of the total ink weight.

The amine curing agent preferably constitutes from 0.5 to 25% of the weight of the epoxy resin.

Unless otherwise indicated, all proportions in this specification and claims are by weight.

The following examples will illustrate the practice of this invention.

*Example 1*

11.8 parts by weight of melted dimethyl terephthalate at 300° F. are added to 48 parts of Epon 836 (an epoxy resin formed by the reaction of p,p'-dihydroxy diphenyl dimethyl methane and epichlorohydrin having an average molecular weight of 710 and an epoxide equivalent weight of about 375) at 150° F. with continuous stirring and the mixture is maintained at 150° F. while 30.4 parts of TiO$_2$ pigment, 4.7 parts of aluminum hydrate and 11.8 parts of dicyandiamide are added and the resulting mixture is then thoroughly mixed.

Then, the composition maintained at 170° F. is applied to a glass surface at about 77° F. through a stenciled screen. Within about 1 second, the applied ink dries to a hard tack-free state. The resulting ink shows good adhesion to glass. The printed ink is then cured by heating at 350 to 400° F. for 10 to 30 minutes. The resulting printed ink is tough, hard, abrasion resistant, and remains resistant and tough even after four hours immersion in water, 45 minutes immersion in water at 150° F., 45 minutes immersion in a 4.5% solution of sodium hydroxide at 160° F. or 1 hour in an autoclave at 15 p.s.i.g. steam pressure. The printed ink is also resistant to 95% ethanol, as well as methyl ethyl ketone.

*Example 2*

The procedure of Example 1 is repeated using the following ingredients:

| | Parts by wt. |
|---|---|
| Epon 836 | 51.4 |
| Dimethyl terephthalate | 5.9 |
| TiO$_2$ pigment | 24.8 |
| Aluminum hydrate | 4.9 |

This ink passes very easily through a stenciled screen at 77° F. on to a glass surface on which it dries in about 1 second.

*Example 3*

Example 2 is repeated using the same ingredients, proportions, procedure and conditions except the dimethyl terephthalate is eliminated. When applied through a screen onto glass in accordance with the procedure of Example 1, the ink tends to dry and harden on the screen before passing through, thereby resulting in incomplete transfer to the substrate.

*Example 4*

Example 1 is repeated using the same ingredients, proportions, conditions and procedure except that diethyl terephthalate is used in place of dimethyl terephthalate. The results are the same as in Example 1.

*Example 5*

Example 1 is repeated using the same ingredients, proportions, conditions and procedure except that diisopropyl terephthalate is used in place of dimethyl phthalate. The results are the same as in Example 1.

*Example 6*

Example 1 is repeated using the same procedure, conditions, ingredients and proportions except that Epon 1001 (an epoxy resin from the reaction of p,p'-dihydroxyl diphenyl dimethyl methane and epichlorohydrin having an average molecular weight of about 900 and an epoxide equivalent weight of about 500) is used in place of Epon 836. The results are similar to those of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A composition comprising (1) an epoxy resin produced by the reaction of p,p'-dihydroxy diphenyl dimethyl methane and epichlorohydrin and containing a plurality of 1,2-epoxide groups and (2) a dialkyl terephthalate wherein the alkyl group has from 1 to 3 carbons.
2. The composition of claim 1 wherein said terephthalate is dimethyl terephthalate.
3. The composition of claim 1 wherein said terephthalate is diethyl terephthalate.
4. The composition of claim 1 wherein said telephthalate is diisopropyl terephthalate.
5. The composition of claim 1 wherein said epoxy resin has an average molecular weight from about 700 to 900.
6. An ink comprising pigment dispersed in the composition of claim 1.
7. The ink of claim 6 wherein said ester is dimethyl terephthalate.
8. The ink of claim 6 wherein said ester is diethyl terephthalate.
9. The ink of claim 6 wherein said ester is diisopropyl terephthalate.
10. The ink of claim 6 wherein said epoxy resin has an average molecular weight from 700 to 900.
11. The composition of claim 1 further including dicyandiamide.
12. The composition of claim 2, further including dicyandiamide.
13. The composition of claim 1 in liquid form.
14. The composition of claim 2 in liquid form.

References Cited

UNITED STATES PATENTS 2,553,718   5/1951   Newey et al. _____ 260—31.8

WILLIAM H. SHORT, *Primary Examiner.*

T. KERWIN, *Assistant Examiner.*